United States Patent [19]

Risdon

[11] 4,246,688
[45] Jan. 27, 1981

[54] METHOD OF ANCHORING IN CONCRETE

[76] Inventor: Grant S. Risdon, 21 Meadow Pl., Carmel Valley, Calif. 93924

[21] Appl. No.: 949,218

[22] Filed: Oct. 6, 1978

[51] Int. Cl.³ .............................................. B23P 19/02
[52] U.S. Cl. ................................ 29/426.5; 29/526 A; 411/54; 411/55
[58] Field of Search ................. 29/522 R, 526 R, 427, 29/426.5; 85/73, 74, 79

[56] References Cited

U.S. PATENT DOCUMENTS

| | | | |
|---|---|---|---|
| 3,277,770 | 10/1966 | McCulloch | 85/79 X |
| 3,523,482 | 8/1970 | Ploch | 85/73 |
| 4,056,037 | 11/1977 | McIntyre | 85/74 |
| 4,140,040 | 2/1979 | Modrey | 85/79 X |

FOREIGN PATENT DOCUMENTS 2352979  10/1978  France ........................... 85/74

Primary Examiner—Charlie T. Moon

Attorney, Agent, or Firm—Fulwider, Patton, Rieber, Lee & Utecht

[57] ABSTRACT

A fastener for securing an object to a concrete mounting pad is provided with an elongated interiorally threaded annular core. The upper section of the core is of a cylindrical outer configuration while the lower section is tapered as a fustrum of a cone to an overhanging ledge at the lower extremity of the upper section. An expansion device includes two half rings, initially held together by tape. The expansion device encircles the conical fustrum just below the ledge. Upward force upon the core pulls a larger portion of the fustrum through the half rings, thus directing them radially outward and securing the expansion device and the core captured by it in an anchor shaft in the concrete. Conversely, downward force on the core removes the radially outward force on the expansion device and allows the anchor to be driven to the bottom of the anchor shaft bore.

3 Claims, 4 Drawing Figures

METHOD OF ANCHORING IN CONCRETE

BACKGROUND OF THE INVENTION

1. Field of the Invention

The present invention relates to devices and methods for anchoring objects in concrete or other massive, rigid structures which are accessible only from a single surface.

2. Description of the Prior Art

For many years, it has been desirable to anchor objects, such as mounting plates, heavy machinery and other articles firmly in position upon a rigid, massive surface, such as a concrete floor. While the same problems of attachment occur in brick, stone, and other massive rigid materials, concrete is most frequently used as a floor support because of its relative ease of installation and because it can be cast in large sections.

In the past, the most common type of concrete anchor has been a device which is secured to the concrete in an anchor shaft by means of frictional engagement against the walls of the shaft. While several versions of such attachment devices exist, the most commonly used concrete anchor is an article called a "redhead". A redhead anchor is constructed of two portions: an elongated interiorally threaded cylindrical annular core, and a conical pin directed into one end of the core. The redhead is installed by boring an anchor shaft with a masonry drill to a depth just slightly in excess of the overall length of the redhead core. The core is then driven into the shaft from one end with the conical pin positioned in the lower end of the core with the conical apex directed upward. As the core is driven into the anchor shaft, the conical pin touches bottom and can move no further. Further driving force on the core drives the core downward toward the larger portion of the conical pin, thus creating a substantial outward force on the walls of the core as the pin is wedged into the lower end of the core. A threaded fastener, such as a bolt, may then be threadably engaged with the core from the upper end thereof to entrap a mounting plate, or the base of a heavy article of machinery in position on the concrete surface.

Distinct disadvantages exist with conventional "redhead" and other types of concrete anchors heretofore available. In the first instance, it is necessary to bore the anchor shaft to a relatively precise depth. If the shaft is too shallow, the upper extremity of the core will protrude above the concrete surface. If the shaft is to deep, a substantial gap will exist below the concrete surface and above the upper extremity of the core when the core is driven into position. This reduces the area of threaded engagement of the fastener in the core, and in extreme cases will preclude the fastener from engaging the core at all.

A further problem with conventional redhead devices is that the length of the fastener shank must be cordinated with the length of the redhead core. If the shank of a bolt fastener is too short, insufficient engagement will exist between the bolt shank and the core. If the bolt is to long, it cannot be seated properly in the core, since the apex of the conical redhead will interfere with the extreme end of the threaded shank of the bolt.

A further problem exists with conventional redhead concrete anchors in that they are sometimes dislodged by upward force on the core. Such upward force is frequently developed by the vibration of machinery held down by a fastener engaged in a redhead core or by direct upward force which may develop for a variety of reasons. When upward or outward force acts upon the head of the fastener, it is transmitted along the shank of the fastner as a tensile force tending to pull the core away from engagement with the conical pin. Even the slightest disengagement will reduce the radially outwardly directed forces on the walls of the core, and thus facilitate separation of the core from the redhead pin. It is thus entirely possible for the core portion of a redhead concrete anchor to be pulled entirely free of the pin and out of the anchor shaft.

A further problem with conventional devices is the requirement for an anchor shaft of relatively precise depth. In addition to the problems of interference with the fastener bolt shank and insecure engagement of the bolt shank with the anchor core, conventional concrete anchors can not always be easily removed when desired. Although such anchors sometimes effectuate undesired release from the concrete, at other times they are locked immovably in place. This represents a considerable inconvenience when the core has been damaged and is unsuitable for further use, or when a machine is to be moved, and it is desirable to remove the anchor and refill the anchor shaft. In such cases, the anchors are sometimes completely immobile and can be removed or partially removed only by laborious drilling from above.

While other types of conventional concrete anchors exist, other than "redheads", all such devices have one or more of the attendant disadvantages described above.

SUMMARY OF THE INVENTION

The present invention involves a method of anchoring an object in concrete in which the immobilizing force holding the anchor in place is increased even though forces are exerted to draw the anchor out of the anchor shaft. Conversely, with the present invention, the anchor can be removed from the surface of the concrete by driving it downward into the shaft, whereupon forces immobilizing the anchor in the shaft are reduced. The structure utilized in this regard includes an interiorally threaded annular core which has an upper section formed in an outer cylindrical configuration, and a lower section formed as a frustrum of a cone, tapered upward to an overhanging shoulder formed by the lower extremity of the upper section. An expansion device is positioned about the core just below the overhanging shoulder. The expansion device is formed by a pair of half rings which encircle the conical frustrum and which are initially held in position below the shoulder by tape.

It is to be understood that the conventions "upper" and "lower", used to describe the anchor construction are utilized considering the normal anchor orientation, which is downward into a floor. This conventions is reversed if the anchor is to be used as a ceiling mount. Alternatively the "upper" cylindrical section in a laterally directed wall mounted anchor is actually that section closest to a wall surface, while the "inner" conical frustrum section is that portion of the anchor embedded most deeply in a wall.

The anchor shaft has a minimum depth equal to the overall length of the core, but there is no maximum depth for the anchor shaft. Indeed, in some applications it is desirable for the anchor shaft to be at least twice the overall core length, with no particular precision beyond that involved. In such an application, once an anchor according to the present invention has out lived its usefulness, it can be easily driven downward into the anchor shaft. The anchor shaft of the core can then be filled with concrete, or another servicable anchor according to the present invention, can be inserted therein.

Once an anchor shaft has been bored in the concrete, an anchor according to the present invention is inserted therein. The core diameter is slightly less than the bore diameter of the anchor shaft. The outer diameter of the expansion ring is slightly larger, but still small enough to allow insertion of the anchor structure into the anchor shaft. The core is inserted to slightly below the surface of the concrete. A threaded fastener, such as a bolt is then engaged and tightened to entrap a mounting plate or the base of a machine and to concurrently draw the core slightly upward toward the surface of the concrete. As the core moves upward, the split rings, being of a slightly larger diameter, are held in position by friction with the anchor shaft walls. Moreover, upward movement of the core brings the expanded portion of the conical frustrum of the lower section of the core into registration with the split rings. This pushes the half rings radially outward against the anchor shaft walls even harder, thus enhancing the immobilizing effect. The fastner is tightened securely so that a very substantial radially outwardly directed force exists on it. By this time the overhanging shoulder of the upper section of the core has been longitudinally drawn away from the split rings a short distance.

To dislodge the concrete anchor from a position at the surface of the concrete, the core is driven downward into the anchor shaft. This brings the narrower portion of the conical fustrum into position adjacent to the split rings. The radially outwardly directed forces on the split rings are thereby reduced. Further driving force on the core causes the overhanging shoulder to capture the split rings to that they are also carried in downward movement of the core deeper into the anchor shaft. The anchor shaft can then be filled with concrete above the used concrete anchor, or a new concrete anchor can be positioned just below the surface of the concrete in the manner previously described.

A further advantage of the present invention is that the structure does not entail any axially disposed wedge type insert, such as are used in conventional redhead fasteners. As a consequence, the entire length of the threaded interior of the core is unobstructed and is free at both ends. Bolts of any length can be used with the concrete anchor of the invention, as long as they are of the proper thread diameter and pitch and as long as the anchor shaft has been drilled deep enough.

The invention may be explained with greater clarity and particularly with reference to the accompanying drawings.

DESCRIPTION OF THE EMBODIMENT

Figure 1:
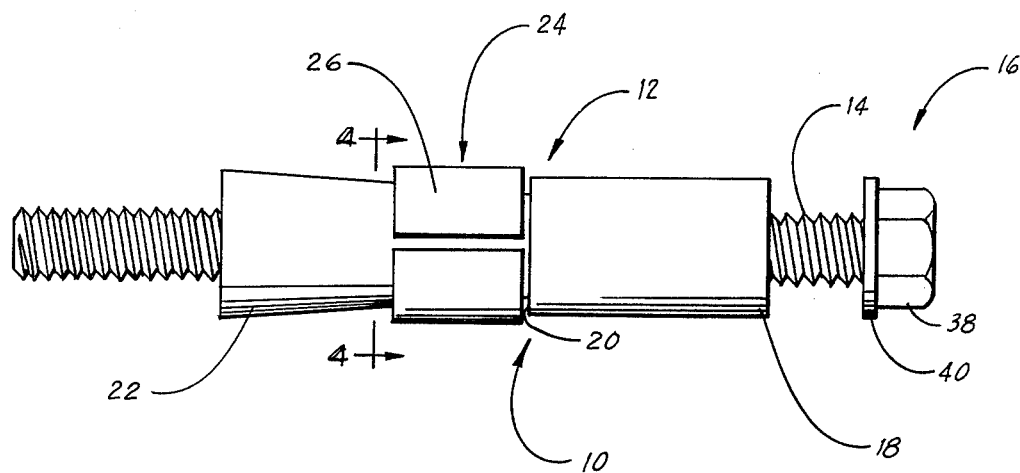
FIG. 1 illustrates the concrete anchor of the invention viewed externally.

FIG. 1 depicts an anchor 10 which has a steel core 12 of annular construction interiorally threaded to receive the threaded shank 14 of a stud bolt 16. The core 12 has an upper section 18 of cylindrical outer configuration and with an overhanging shoulder 20 at its lower extremity. The core 12 also includes a lower section 22 shaped as a fustrum of a cone converging upward to meet the transverse overhanging ledge 20 of the upper section 18. An annular expansion device 24 encompasses the lower conical section 22 just below the ledge 20.

Figure 2:
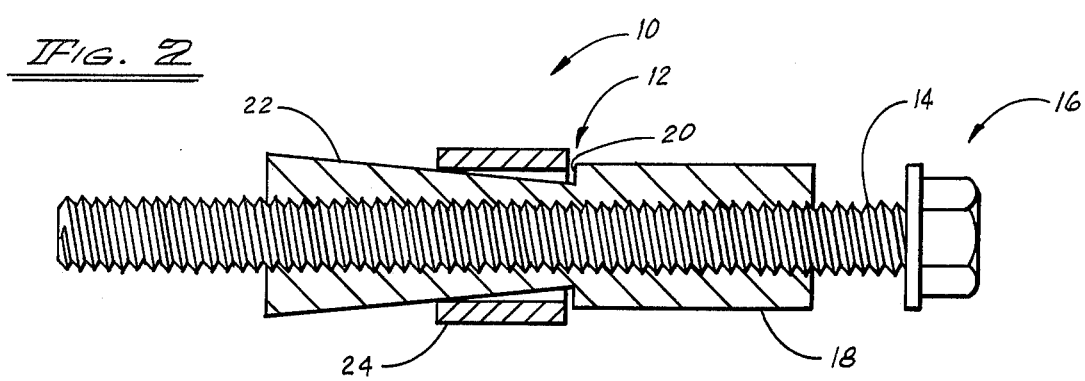
FIG. 2 is a cross sectional view of FIG. 1.
Figure 4:
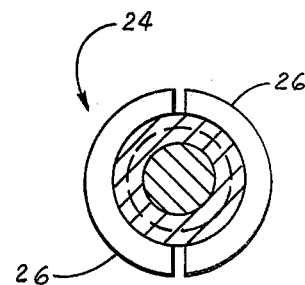
FIG. 4 is a sectional view taken along the lines 4—4 of FIG. 1.

The expansion device 24 includes a pair of semicircular ring halves 26 both having an upper end 27 facing the shoulder 20 and a lower end 29 remote from the shoulder 20. The ring halves 26, which together encircle in a generally circular line of contact 31 thereabout at the lower ends 29, the lower conical section 22, as depicted in FIGS. 1 and 4. The half rings 26 are initially held in position by circumferential wraps of tape thereabout. The ring halves 26 are formed of a malleable metal, such as lead, and are of semicylindrical annular cross section formed with an outer surface 33 having a uniform diameter throughout and an inner surface 35, likewise having a uniform diameter throughout, as depicted in FIGS. 2 and 4. The expansion device 24 need not entirely encircle the core 12, as it is only necessary for it to encompass the core 12 to a substantial degree.

Figure 3:
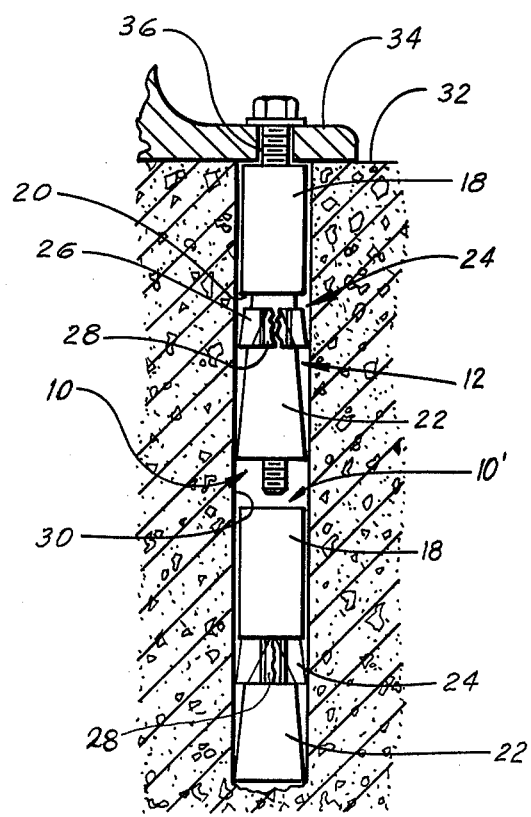
FIG. 3 illustrates the method of utilization of the anchor of FIGS. 1 and 2.

To utilize the anchor 10, an anchor shaft 30 is bored into a concrete structure 32 normal to the exposed surface thereof, as depicted in FIG. 3. An anchor 10, having a core 12 of maximum diameter sized to fit within the diameter of the anchor shaft 30 is forced down into the anchor shaft 30. In its installation, it should be noted that the maximum outer diameter of the expansion half rings 26 exceeds the diameter of the cylindrical upper section 18 of the core 12 and the diameter of the core base of the section 22 by a slight amount. The expansion device 24 is nevertheless carried downward into the anchor shaft 30 by force applied at the top of the core 12 since it is trapped and carried along by the overhanging shoulder 20 of the cylindrical upper section 18.

The core 12 is driven to a position in which the upper extremity of the upper cylindrical section 18 lies slightly below the level of the floor of the concrete structure 32. A machine, baseplate or other object to be fastened to the floor of the concrete structure 32 is then moved into position over the anchor shaft 30. A base 34 of the machine includes an aperture 36 therein through which the stud bolt 16 can be inserted. The shank 14 of the stud bolt 16 is then threadably engaged with the core 12, beginning at the upper section 18 and continuing continuously through to the lower conical section 22. It should be noted that at no point is there an axial obstruction to the longitudinal progression of the shank 14 of the stud bolt 16 through the core 12.

As the bolt head 38 and surrounding washer 40 of the stud bolt 16 begins to tighten down upon the baseplate 34 of the machine to be attached to the concrete 32, continued threaded engagement of the shank 14 begins to draw the core 12 slightly upward within the anchor shaft 30. This upward movement is resisted, however, by the expansion device 24, since it is of larger diameter than the core 12, and is more immediately locked against the walls of the anchor shaft 30. Upward progression of the conical section 22 relative to the expansion ring halves 26 produces radially outwardly directed forces on the expansion ring halves 26 forcing them apart and breaking the thin webs 28 which may be provided to initially hold the ring halves together. These forces increase the frictional engagement of the anchor 10 in the anchor shaft 30. The frictional force holding the anchor 10 in position continues to increase with upward force on the core 12, since any continued upward movement of the core 12 results in a larger diameter portion of the lower section 12 bearing against the half rings 26. Very quickly the tremendous frictional forces developed will prohibit further upward movement of the anchor 10, despite forces which tend to draw the stud bolt 16 away from the surface of the concrete 32.

At various times, it may be desirable to replace the anchor 10. This may be necessary due to a shearing of threads therein, breaking off of the shank 14 of the stud bolt 16 in the anchor 10, or merely as a result of a desire to relocate the machine and the baseplate 34 thereof. Whatever the reason, the anchor of the invention may be moved out of the way downward deeper into the anchor shaft 30 with relative ease. In the illustration of FIG. 3, a previous anchor, depicted at 10' is shown driven to the bottom of the anchor shaft 30. Normally, to dislodge an undesired anchor, the stud bolt 16 will be removed from engagement with the core 12 prior to driving the anchor 10' to the bottom of the anchor shaft 30. If the shank 14 of the stud bolt 16 has broken off in the core 12, this, of course, is not possible.

Downward force on the upper extremity of the upper section 18 of the core 12 tends to reduce the forces of friction restricting movement of the anchor 10' within the bore 30. That is, a downward force on the upper extremity of the upper section 18 removes the wider part of the conical section 22 from frictional engagement with the expansion ring halves 26, and brings the narrower portion thereof into registration with the expansion device 24. This reduces the radially outwardly directed forces tending to hold the expansion device 24 and the lower section 22 longitudinally immobile. Eventually, the shoulder 20 will be driven against the expansion ring halves 26. The interior diameter of the expansion ring halves 26 is smaller than the maximum diameter of the shoulder 20, so that the expansion device 24 is carried downwardly into the anchor shaft 30 along with the core 12. Since the frictional resistance to movement in a downward direction is considerably less than resistance to movement upwards, the anchor 10' can be driven to the bottom of the anchor shaft 30 without undue effort. Thereafter, the anchor shaft 30 can be filled with cement above the anchor 10' or a new anchor 10 can be positioned therein, in the manner depicted in FIG. 3.

Preferably, the diameter of the base of the conical section 22 is equal to the diameter of the upper section 18. The additional thicknesses of the opposing sections 26 of the expansion device 24 ensures that the overall diameter of the expansion device 24 about the conical section 22 exceeds the diameter of the cylindrical upper section 18. Also, the interior diameter of the ring halves 26 of the expansion device 24 is less than the outer diameter of the upper section 18 at the shoulder 20. This ensures downward movement of the expansion device 24 with the core 12 in the manner described.

It should be noted that there is no limit on the length of the shank 14 of the stud bolt 16. If a different fixture is to be located above the bore 30 and if the machine or other device atop the baseplate 34 is to be removed, a stud bolt of different length can be substituted for the stud bolt 16. To enjoy the flexibility of being able to substitute fastners, it is desirable for the anchor shaft 30 to be deeper than at least twice the overall length of the core 12. This provides sufficient clearance between the extreme downward end of the shank 14 of a stud bolt 16 and the upper extremity of a previously used anchor 10'. Even if the depth of the anchor shaft 30 is not great, however, it should be noted that because of the coaxial arrangement of the anchors 10 and 10' the shank 14 of the stud bolt 16 could, if long enough, proceed through threaded engagement with the anchor 10 and continue with threaded engagement in the core 12 of the anchor 10'. This is not recommended, however, because of the possibility of prior distortion of the previously utilized anchor 10'.

Undoubtedly, numerous variations and modifications of the present invention will occur to those familiar with fasteners for use in attaching articles to massive supports accessible from only one surface. Accordingly, the present invention should not be construed as limited to the specific embodiment of the invention depicted, rather is defined in the claims appended hereto.

I claim:

1. A method of anchoring an object upon a rigid structure comprising:

forming a shaft in said structure, inserting into said shaft an anchor having an elongated annular core no greater than half the length of said shaft and interiorally threaded throughout its length said core having an upper section of cylindrical outer configuration of a diameter sized to fit within the diameter of said shaft and forming a transverse overhanging shoulder at its lower extremity and a lower section shaped as a fustrum of a cone converging upward to meet said transverse overhanging shoulder a malleable metal expansion device formed of a pair of semicircular, semicylindrical half ring sections having a uniform inner diameter and a uniform outer diameter throughout their lengths encompassing said lower section below said shoulder, engaging an elongated threaded fastener with said object and threadably engaging said fastener with said core, whereby upward force on said core draws said core slightly upward and increases radially outwardly directed force on said expansion device to immobilize said anchor in said shaft, tightening said fastener into said core to take up any slack that develops from upward movement of said core in said bore, and ultimately dislodging said anchor by driving said core further downward into said shaft a distance at least equal to the length of said core, whereby said shoulder carries said expansion device with said core as said core is driven downward.

2. The method of claim 1 further comprising thereafter replacing said anchor with a new anchor by inserting said new anchor as aforesaid.

3. The method of claim 1 further comprising removing said fastener from said core prior to driving said core downward into said shaft.

* * * * *

UNITED STATES PATENT OFFICE
CERTIFICATE OF CORRECTION

Patent No. 4,246,688　　　　　　　　Dated January 27, 1981

Inventor(s) GRANT S. RISDON

It is certified that error appears in the above-identified patent and that said Letters Patent are hereby corrected as shown below:

The spelling of the word --frustum-- should be corrected where it appears in line 5 of the Abstract and in the SPECIFICATION at column 2, line 46; column 2, line 51; column 2, line 62; column 3, line 24; column 3, line 36; column 4, line 9; and column 6, line 38.

The spelling of --outlived-- should be corrected at column 3, line 2.

The spelling of --fastener-- should be corrected at column 3, line 28.

The spelling of the word --fasteners-- should be corrected at column 6, line 5.

A comma should be inserted after the word --shoulder-- at column 6, line 40.

Signed and Sealed this

*Second* Day of *June 1981*

[SEAL]

*Attest:*

RENE D. TEGTMEYER

*Attesting Officer*　　*Acting Commissioner of Patents and Trademar.*